Figure 2:
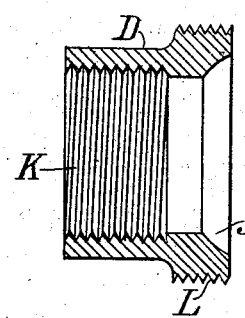

(No Model.)

T. F. HAMMER.
PIPE JOINT AND UNION.

No. 605,098. Patented June 7, 1898.

WITNESSES:
Fred White
Thomas F. Wallace

INVENTOR:
Thorvald F. Hammer,
By his Attorneys,

UNITED STATES PATENT OFFICE.

THORVALD F. HAMMER, OF BRANFORD, CONNECTICUT.

PIPE-JOINT AND UNION.

SPECIFICATION forming part of Letters Patent No. 605,098, dated June 7, 1898.

Application filed July 30, 1897. Serial No. 646,460. (No model.)

*To all whom it may concern:*

Be it known that I, THORVALD F. HAMMER, a citizen of the United States, residing in Branford, in the county of New Haven and State of Connecticut, have invented certain new and useful Improvements in Pipe-Joints and Unions, of which the following is a specification.

This invention relates to unions for pipe-joints, and aims to provide certain improvements therein.

Heretofore unions have consisted of two screw-threaded thimbles adapted to be screwed, respectively, on the adjacent ends of lengths of pipe, the one having an external screw-thread and the other a head or enlargement, by means of which they have been coupled together with a nut consisting of an internally-threaded ring screwing on the outer thread of one thimble and having a flange embracing the head of the other thimble for drawing them together. Their adjoining ends have been variously formed in attempts to make a compensating joint for taking up any imperfections in construction and making a tight joint, a ring of packing material being usually fixed in a recess in one for engaging the face of the other.

In unions as heretofore constructed difficulty has been encountered in making a joint either tight or sufficiently flexible to adapt itself to imperfections or to imperfect alinement of the pipes, and much care and expense have been required in so dressing off the various faces of the members of the union that a tight joint could be obtained.

My invention provides an improved construction of union in which simplicity and cheapness are attained, while a tight joint is provided, and the union is sufficiently flexible to compensate for any slight cant in the pipes.

In carrying out the preferred form of my invention I provide, in addition to the two thimbles and the nut, a separate ring of soft metal or other suitable material seated between the ends of the thimbles and separating the latter slightly, and I construct this ring of spherical or bulbous contour externally and form reciprocal concavities or sockets in the ends of the thimbles, into which sockets the ring seats in such way that the thimbles can oscillate slightly about the ring or the ring can oscillate in the sockets until a true seat is found, and I form the head on the one thimble and the bearing-flange on the nut screwing on the other thimble with reciprocal faces of such shape that tilting of the one thimble relatively to the other is permitted to a slight extent, preferably forming the head and flange as segments of a sphere the center of which coincides with the center of the sphere of which the adjacent face of the ring is a segment, and I construct the thimbles and nut in such manner that no dressing or finishing of their surfaces is required other than the formation of the screw-threads and of the sockets for receiving the ring.

Figure 1:
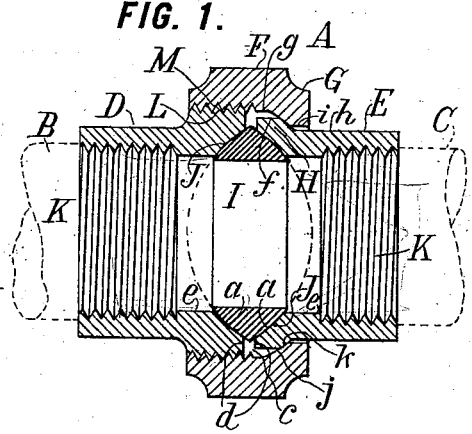
Figure 3:
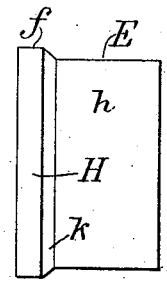
Figure 4:
Figure 5:
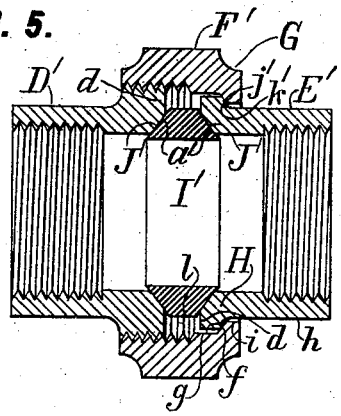

In the accompanying drawings, Figure 1 is an axial section of a union embodying the preferred form of my invention. Fig. 2 is a similar section of the screw-threaded thimble alone. Fig. 3 is an elevation of the headed thimble alone. Fig. 4 is an elevation of the ring alone, and Fig. 5 is an axial section of a union in which the ring has bearing-faces in the shape of segments of cones and the sockets and head and nut have similar faces.

Referring first to Figs. 1 to 4 of the drawings, let A indicate the union as a whole; B C, the ends of two pipes united thereby, which are shown in dotted lines; D, the externally-threaded thimble or member of the union; E, the headed member thereof; F, the nut uniting the members D and E; G, the flange of this nut; H, the head of the member E; I, the compensating ring, and J J the sockets therefor in the members D and E. Each member has an internal screw-thread K, and the member D has an enlarged screw-threaded end L, over which the thread M of the nut F screws.

According to the preferred form of my invention the ring I is of soft metal, although it may be of any other suitable material, and is of bulbous or spherical exterior, being preferably formed with two bearing-faces $a$, each in the form of a segment of a sphere, the sphere for each face in the construction shown being struck from a different center than that for the other and each center being equidistant from the center line $b$, surrounding the ring. The sockets J are formed in the hollow ends of the thimbles and are of a contour reciprocal to that of the adjacent face of the ring. Each socket is sufficiently shallow to limit the entrance of the ring into it, so that a space $c$ is preserved between the end faces $d$ of the thimbles when the ring is between them, which space is necessary to permit tilting movement of one thimble relatively to the other and to permit movement of the ring to a properly-seated position in case the turning of the sockets in the thimbles should not be entirely true. The faces $d$ being thus kept separate and performing no function need not be trued or dressed off. The same is true of the surfaces $e$ within each thimble between the screw-threads K and the sockets J.

To permit independent movement between the thimble E and nut F, the outer wall $f$ of the head H is made of less diameter than the inner wall $g$ of the nut F, and the outer wall $h$ of the thimble is made of less diameter than the inner wall $i$ of the flange G, so that there is room for lateral movement of the thimble relatively to the flange.

To permit tilting of the thimble, the bearing-faces of the head and flange are so constructed that the thimble can be tilted without impairing the tightness of the joint. Preferably the flange has a concave annular bearing-face $j$ and the head a convex annular bearing-face $k$, each being shown as segments of a sphere concentric to the sphere of which the adjacent face $a$ of the ring I is a segment and all consequently struck from the same center. This permits an extensive tilting movement between the thimbles D and E without disturbing or impairing the joint and insures the proper and uniform seating of the thimbles and ring when the nut F is screwed home.

When the parts are constructed as described, all the external faces of the thimble E may be undressed surfaces, so that the only dressing required will be the cutting of the thread K and turning of the socket J. All the surfaces of the nut can be undressed except that of the thread M, which must be cut, and all the surfaces of the thimble D can be undressed except its thread K and socket J. The union is thus very cheaply and easily constructed. A great economy is effected by the fact that with the new unions it is unnecessary to true and dress off the faces $d$ of the thimbles and the faces $j$ $k$ of the nut and head, so that a true joint could be made by clamping the thimbles together. The making of the ring separate from and unattached to any of the other parts enables its ready application and convenient renewal, as well as permitting it to compensate for irregularities, which compensation is sufficient to avoid the necessity for dressing the faces $j$ and $k$. With the improved ring these faces may be of any form which will give a loose movable connection between the thimble E and nut F. The formation of the ring with like sides and of each thimble with similar sockets avoids the necessity for care in locating the ring and permits its reversal, if desired.

The new union as described constitutes a new article of manufacture which is sold with the parts assembled ready for use and which in case of necessity can be repaired by simply uncoupling the thimbles and substituting a new ring I for an impaired one.

In use the union may be applied to the pipes while its parts are assembled by screwing the pipe ends into the thimbles, or the union can be separated and the ends screwed on separately to the respective pipes, after which the ring I may be placed between the adjacent ends of the thimbles, and the joint can be completed and made tight by screwing up the nut F. Excessive tightening of the nut will not impair the joint, since the adjacent faces of the ring and thimbles are of reciprocal formation and the ring is free to move to a true position between them and there are no opportunities for sharp corners to cut it or for unequal compression at any point.

It will be seen that my invention provides an improved union which can be readily and advantageously availed of, and it will be understood that it is not limited to the exact details of construction and arrangement set forth as constituting the preferred form of my invention, since it can be employed according to such modifications as circumstances or the judgment of those skilled in the art may dictate without departing from the spirit of the invention.

Fig. 5 shows a modification in which the ring I' has oppositely-tapering faces $a'$ in the form of segments of cones, and the sockets J' are similarly formed. The ends $d$ of the thimbles are here widely separated from each other by reason of the cylindrical wall $l$ between the conical faces of the ring. The thimbles D' and E' and the nut F are here similar in construction to those before described, except in the respects noted and in that as to the face $j'$ of the nut and the face $k'$ of the head H only one is parallel with the adjacent face of the ring, the one shown being the face $j'$, which is formed as a segment of a cone instead of as a segment of a sphere. The faces $f$ and $g$ of the head and nut and $i$ and $h$ are separated in this construction, substantially as before described, and for the same purpose.

It will be understood that so far as my invention is concerned the members D and E may be of any suitable or usual construction for such members of a pipe-joint and that they may be coupled together against the ring in any suitable way, the term "nut" as herein used being intended to cover any means for fastening together the adjacent ends of the two tubular members of a pipe-joint. When such means permit a play or lost motion between the members, as described, the latter are permitted to center and properly seat themselves on the separate ring between their ends.

What I claim is—

1. In unions for pipe-joints and the like, two tubular members having adjacent ends, and having concave sockets in said ends, and a nut coupling said ends together, in combination with a ring clamped between said ends, unattached to either of said members, and having a convex exterior fitting in said sockets and separating the ends of said members, said members clamped by said nut against said ring, and relatively movable laterally of each other, said nut permitting relative lateral movement of said members, and said ring free to move in said sockets to compensate for imperfections.

2. In unions for pipe-joints and the like, two tubular members the one having an external screw-thread and the other an external head on their adjacent ends, and having opposite sockets in such ends, in combination with a separate ring between and separating said ends, and seated in said sockets, and a nut screwing on said thread and having a flange embracing said head and drawing said parts together against said ring, said nut and head having engaging faces $j$ and $k$ for drawing said parts together, and separated walls $f\ g\ h$ and $i$ permitting lateral movement of the headed member relatively to the nut.

3. In unions for pipe-joints and the like, the combination with two tubular members having adjacent ends having flaring sockets in such ends, the one having an external screw-thread and the other an external head at such ends, of a ring between and separating said ends, having a bulbous exterior entering said sockets and free to move therein to seat itself, and a nut screwing on the end of the threaded member, and having a flange engaging the head of the headed member for drawing the members together against said ring, said nut loosely engaging the headed member and permitting axial tilting thereof, and said nut and headed member having engaging concave and convex faces, whereby the headed member can be tilted around said ring.

4. In unions for pipe-joints and the like, two tubular members having adjacent ends having opposite sockets, the one member having an external screw-thread and the other an external head near their ends, in combination with a ring having a bulbous exterior between and separating said ends and fitting in said sockets, and a nut screwing on said thread and having a flange engaging said head and clamping said members against said ring, said head having a bearing-surface engaged by said flange which is parallel with the adjacent bulbous-shaped surface of said ring, whereby said headed member can be tilted around said ring within said flange.

5. In unions for pipe-joints and the like, two tubular members having adjacent ends having opposite sockets in said ends, the one having an external screw-thread and the other an external head, in combination with a ring between and separating said members, having a bulbous-shaped exterior fitting in said sockets, and a nut screwing on said thread and having a flange engaging said head and clamping said members against said ring, said flange having a bearing-surface engaging said head and parallel with the adjacent bulbous-shaped surface of said ring, whereby the headed member can be tilted axially without disturbing said ring.

6. In unions for pipe-joints and the like, two tubular members having adjacent ends, and having concave sockets in said ends, and means coupling said ends together, in combination with a separate ring clamped between said ends, unattached to either of said members, and having a convex exterior fitting in said sockets and separating the ends of said members, said members clamped by said means against said ring and movable laterally relatively to each other, said means permitting relative lateral movement of said members, and said ring free to move in said sockets to compensate for imperfections.

In witness whereof I have hereunto signed my name in the presence of two subscribing witnesses.

THORVALD F. HAMMER.

Witnesses:
GEORGE H. FRASER,
FRED WHITE.